(12) United States Patent
Morselli et al.

(10) Patent No.: US 8,160,765 B2
(45) Date of Patent: Apr. 17, 2012

(54) METHOD AND SYSTEM FOR COORDINATED VEHICLE CONTROL WITH WIRELESS COMMUNICATION

(75) Inventors: Riccardo Morselli, San Vito (IT); John Posselius, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 1080 days.

(21) Appl. No.: 12/041,310

(22) Filed: Mar. 3, 2008

(65) Prior Publication Data

US 2009/0222160 A1 Sep. 3, 2009

(51) Int. Cl.
*A01B 69/00* (2006.01)

(52) U.S. Cl. .. 701/25; 340/684; 340/686.1; 340/995.19; 340/438; 56/10.2 R; 56/10.2 A; 56/10.2 D; 56/10.2 F; 701/23; 701/24; 701/26; 701/27; 701/28; 701/41; 701/45; 701/70; 701/116; 701/205; 701/300

(58) Field of Classification Search ...... 356/3; 340/684, 340/686.1, 988–996, 435, 436, 438; 56/10.1, 56/10.2 A–11.9, 14.7–16.4, 16.7, 207; 701/1, 701/23–54, 70, 93–98, 116, 200–216, 300–302; 342/52–58, 118

See application file for complete search history.

(56) References Cited

U.S. PATENT DOCUMENTS

| | | | |
|---|---|---|---|
| 5,646,844 A | | 7/1997 | Gudat et al. |
| 5,919,242 A | * | 7/1999 | Greatline et al. ............... 701/50 |
| 6,032,097 A | * | 2/2000 | Iihoshi et al. .................. 701/96 |
| 6,044,312 A | * | 3/2000 | Sudo et al. ...................... 701/25 |
| 6,148,255 A | * | 11/2000 | van der Lely ................... 701/50 |
| 6,205,381 B1 | * | 3/2001 | Motz et al. ....................... 701/25 |
| 6,216,071 B1 | * | 4/2001 | Motz ................................ 701/50 |
| 6,236,924 B1 | * | 5/2001 | Motz et al. ....................... 701/50 |
| 6,246,932 B1 | | 6/2001 | Kageyama et al. |
| 6,313,758 B1 | * | 11/2001 | Kobayashi ..................... 340/932 |
| 6,385,515 B1 | * | 5/2002 | Dickson et al. ................. 701/28 |
| 6,445,983 B1 | * | 9/2002 | Dickson et al. ................. 701/23 |

(Continued)

FOREIGN PATENT DOCUMENTS

EP 1219153 7/2002

(Continued)

OTHER PUBLICATIONS

EU Search Report and Opinion on application EP2098936, Jun. 8, 2009.

(Continued)

*Primary Examiner* — Jonathan M Dager
(74) *Attorney, Agent, or Firm* — Patrick M. Sheldrake

(57) ABSTRACT

A control system controls a pair of vehicles in coordination to traverse a respective pair of trajectories. The control system is configured to specify a plurality of successive waypoints, a safe stopping interval and an intermediate interval greater than the safe stopping interval, and exchange waypoints between vehicles. The system controls each vehicle in coordination with the other, senses a rate of exchange of waypoint data between the vehicles, and determines the safe stopping interval. The control system updates positions with additional waypoints as the respective vehicles pass by waypoints of the forecasted trajectory, determines the length of the forecasted trajectory remaining and compares it with the intermediate interval and the safe stopping interval. The system generates a warning signal if distance is less than the intermediate interval, and if the distance is less than the safe stopping interval, stops within the safe stopping interval.

8 Claims, 4 Drawing Sheets

U.S. PATENT DOCUMENTS

| | | | | |
|---|---|---|---|---|
| 6,640,164 | B1 * | 10/2003 | Farwell et al. | 701/2 |
| 6,678,582 | B2 | 1/2004 | Waled | |
| 6,687,616 | B1 * | 2/2004 | Peterson et al. | 702/5 |
| 6,791,471 | B2 * | 9/2004 | Wehner et al. | 340/903 |
| 6,859,729 | B2 * | 2/2005 | Breakfield et al. | 701/216 |
| 6,861,957 | B2 | 3/2005 | Koike | |
| 7,062,381 | B1 * | 6/2006 | Rekow et al. | 701/300 |
| 7,149,624 | B2 | 12/2006 | Burzio | |
| 7,373,231 | B2 * | 5/2008 | McClure et al. | 701/50 |
| 7,451,030 | B2 * | 11/2008 | Eglington et al. | 701/50 |
| 7,502,678 | B2 * | 3/2009 | Diekhans et al. | 701/50 |
| 7,537,519 | B2 * | 5/2009 | Huster et al. | 460/114 |
| 7,574,290 | B2 * | 8/2009 | Gibson et al. | 701/26 |
| 7,593,811 | B2 * | 9/2009 | Schmidt et al. | 701/205 |
| 7,603,212 | B2 * | 10/2009 | Ariyur et al. | 701/23 |
| 7,706,948 | B2 * | 4/2010 | Dix et al. | 701/50 |
| 7,739,015 | B2 * | 6/2010 | Senneff et al. | 701/50 |
| 7,747,370 | B2 * | 6/2010 | Dix | 701/50 |
| 7,756,624 | B2 * | 7/2010 | Diekhans et al. | 701/50 |
| 7,835,832 | B2 * | 11/2010 | Macdonald et al. | 701/24 |
| 2002/0165645 | A1 | 11/2002 | Kageyama | |
| 2002/0165649 | A1 * | 11/2002 | Wilhelm Rekow et al. | 701/26 |
| 2004/0193348 | A1 * | 9/2004 | Gray et al. | 701/50 |
| 2005/0075784 | A1 * | 4/2005 | Gray et al. | 701/201 |
| 2006/0047418 | A1 * | 3/2006 | Metzler et al. | 701/207 |
| 2006/0131450 | A1 * | 6/2006 | Samaha | 239/729 |
| 2007/0233348 | A1 * | 10/2007 | Diekhans et al. | 701/50 |
| 2008/0059007 | A1 * | 3/2008 | Whittaker et al. | 701/2 |
| 2009/0113868 | A1 * | 5/2009 | Haffert | 56/14.5 |
| 2010/0070144 | A1 * | 3/2010 | Burke et al. | 701/50 |
| 2010/0318241 | A1 * | 12/2010 | Post, Ii et al. | 701/2 |

FOREIGN PATENT DOCUMENTS

JP            6307334 A        4/1988

OTHER PUBLICATIONS

Reply to communication from the Examining Division on application EP2098936, Oct. 14, 2010.

* cited by examiner

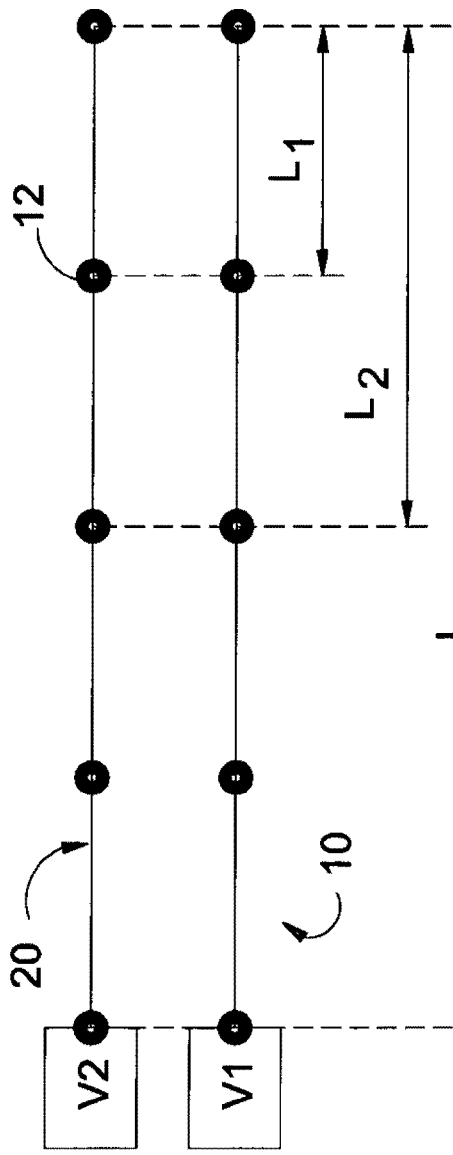
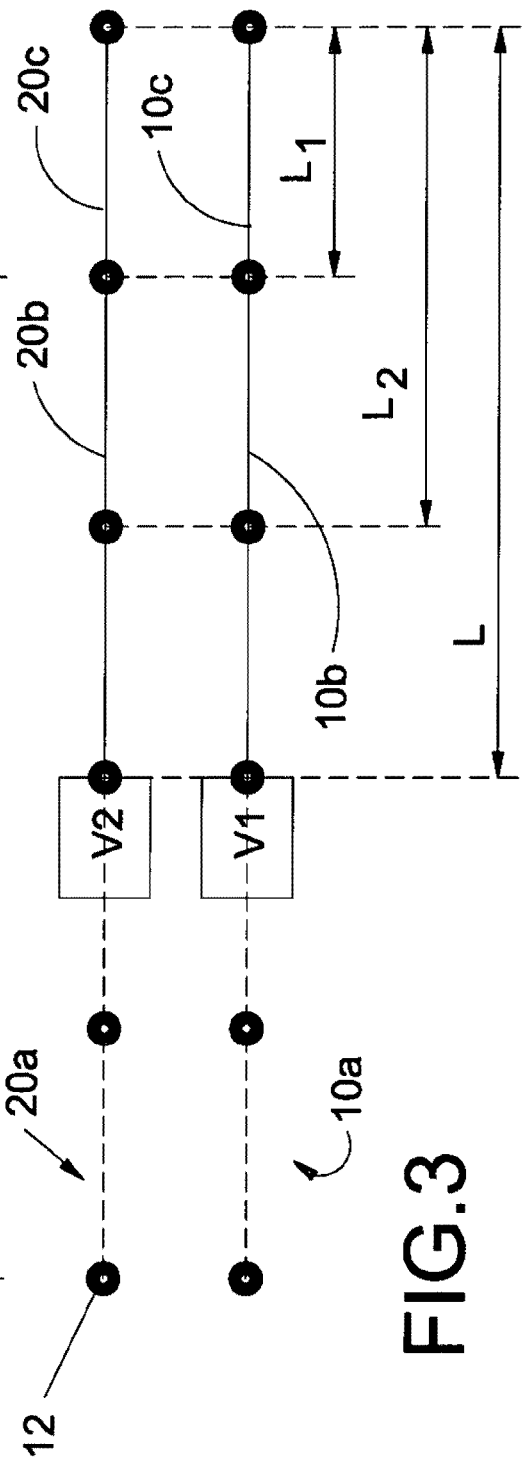

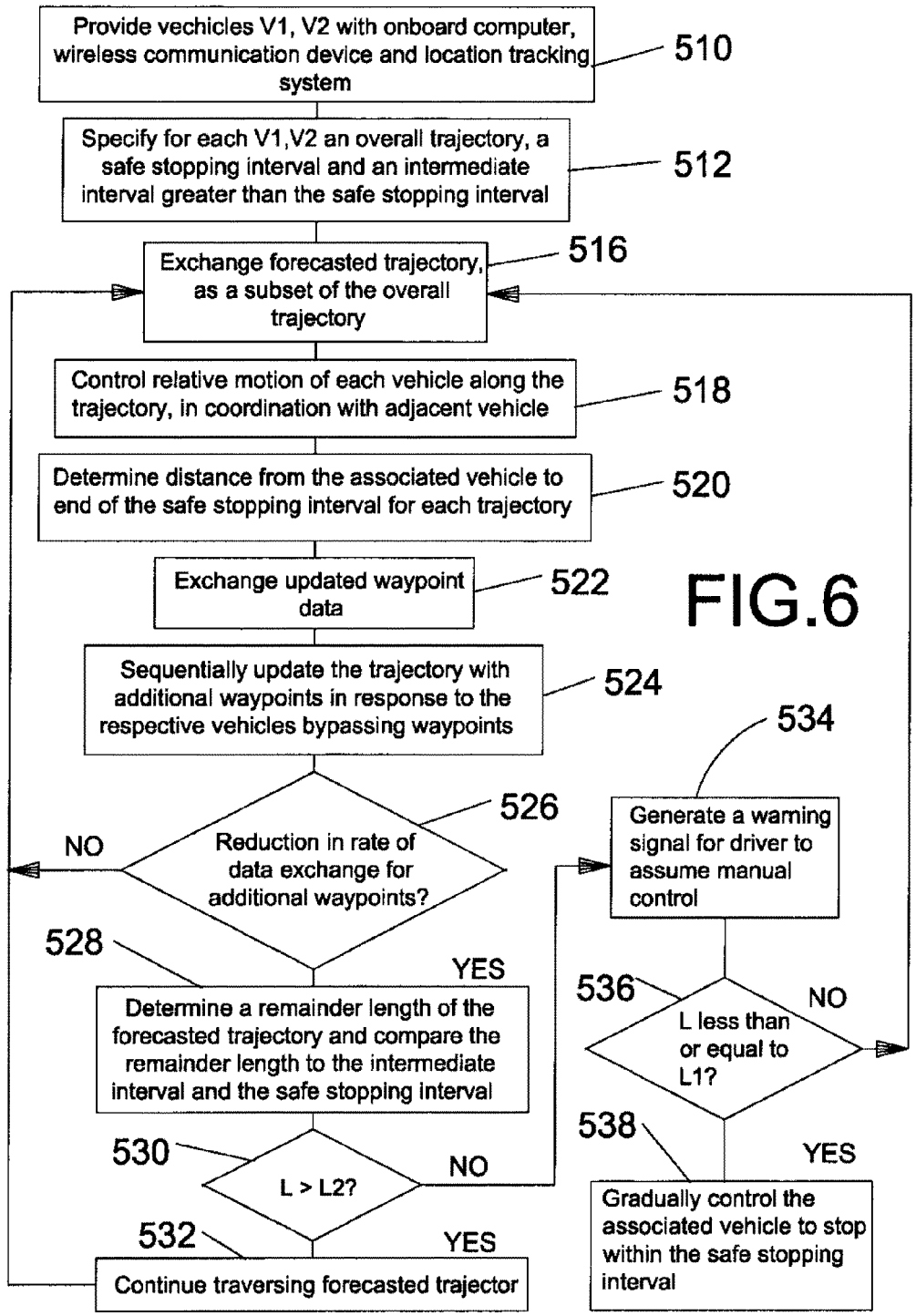

METHOD AND SYSTEM FOR COORDINATED VEHICLE CONTROL WITH WIRELESS COMMUNICATION

FIELD OF THE INVENTION

The present invention relates to a method for coordinated control of two vehicles, and more particularly controlling movement of two agricultural vehicles, e.g., a tractor and a combine, to move in a coordinated path using wireless communication. The present invention relates to a vehicle control device, in particular for agricultural vehicles, such as tractors

BACKGROUND OF THE INVENTION

In recent years agricultural vehicles such as tractors and combines have been equipped with automated guidance controls such as Global Positioning System (GPS). The automated guidance controls provide precise operation and control of the vehicles through open fields and similar terrain. Such satellite guidance systems are used in conjunction with on-board computers, drive by wire components, and electro-hydraulic controls to automatically guide tractors in straight lines or predetermined routes with specified overlap between sequential parallel passes on a field, even at night or with poor visibility. Guidance systems are now available that can control the positioning of subsequent passes to within two centimeters.

In some instances GPS may be used not only as a guidance system for the parallel runs down a field, but also as an information source to control the actions at the end of the field. Using a high-precision Real Time Kinematic (RTK) GPS that includes a local portable base station, the GPS can locate the tractor to within less than two centimeters of a desired path. With this capability and the tractor location information transmitted to a computer that records it, the apparatus of the invention knows and can record precisely the tractor's present location and everywhere the tractor has been. It should be noted that the end of field functions operate just as well with the less accurate differential global positioning systems (DGPS).

When using, e.g., a towed mower, while the first circumferential cut is being made around the edges of the field, the computer is mapping the exact location of the boundaries of the field. Furthermore, with the mower dimensions already entered into the computer and sensors on the tractor and the towed mower to provide information to the computer on the position, operation mode, and orientation of the mower, the computer records the dimensions of the portions of the field that have already been cut. Of course, this also provides the computer with the information needed to determine the exact area and location of the uncut portion of the field enclosed within that first circumferential cut. The same control apparatus is useable with other farm implements that independently shift from one side to the other side of the tractor.

When a tractor is equipped with the integrated guidance system of the invention, after the completion of the first circumferential cut around the edges of the field, the computer has sufficient information in its memory to assume automatic steering control of the tractor. The computer steers the tractor along the uncut crop and keeps the tractor's mower full. When the tractor reaches the end of the field, the computer controls the tractor and the mower towed by the tractor, to lift and swing the mower to the opposite side of the tractor to align the mower for the next pass. The computer monitors velocity, transmission setting, steering, and orientation of the towed mower by means of sensors associated with each function, and the recorded information provided by the GPS gives the computer all the information needed on the size and shape of the field and what portion of the crop is uncut. The tractor's control module then uses the information to control conventional electro-hydraulic valves for control of the main functions of the tractor and the towed implement. On the other hand, the operator can also maintain any portion of the control desired.

In some cases, movement of two vehicles must be coordinated, such as, for example, a tractor traveling adjacent to a combine to load the output of a combine while the combine is harvesting a crop. Such movements must be coordinated accurately and precisely so as to avoid collisions of the vehicles. The control system of each vehicle needs to determine the position of the other vehicle so that they can accurately follow one another along a predetermined course. It is known that wireless communication that is used for transmitting position information, has a latency time, i.e., a delay for exchanging information, and that a service interruption in the wireless communication link prevents the exchange of the position data between the vehicle controllers. Such latency and communication interruptions may potentially cause loss of control of the vehicles and the dangers associated therewith.

What is needed, therefore, is a means for automatically controlling movement of coordinated vehicles when there is an interruption to or loss of communication through the wireless communication system that ensures safe stopping trajectories or paths. These and other advantages are provided by the control method described herein.

SUMMARY OF THE INVENTION

In one embodiment, the present invention is directed to a method for controlling a stopping trajectory for a pair of vehicles traversing a respective pair of overall trajectories, using a control system including an onboard computer and a wireless communication device disposed on each vehicle, and a vehicle location tracking system. The method includes the steps of specifying for each overall trajectory of the pair of overall trajectories, a plurality of successive waypoints along the overall trajectory, a safe stopping interval and an intermediate interval greater than the safe stopping interval; exchanging through the wireless communication device a forecasted trajectory associated with each vehicle to the other vehicle of the pair of vehicles, the forecasted trajectory comprising a subset of the associated overall trajectory; controlling in coordination the relative motion of each vehicle of the pair of vehicles along the respective forecasted trajectory; for each forecasted trajectory, determining the distance from the associated vehicle to an end of the safe stopping interval; updating a position of the vehicles periodically; sequentially updating the forecasted trajectory with additional waypoints in response to the respective vehicles bypassing waypoints of the forecasted trajectory; in response to sensing a reduction in a rate of exchanging additional waypoints, determining a remainder length of the forecasted trajectory and comparing the remainder length to the intermediate interval and the safe stopping interval, and: continuing to traverse the forecasted trajectory in response to the remainder length being greater than the intermediate interval; generating a warning signal in response to the remainder length being less than or equal to the intermediate interval and greater than the safe stopping interval; and gradually controlling the associated vehicle to a stop within the safe stopping interval in response to the safe stopping interval being equal to the safe stopping interval.

In another embodiment, the present invention is directed to a control system for controlling a pair of vehicles concurrently to traverse a respective pair of trajectories. The control system includes an onboard computer and a wireless communication device disposed on each vehicle, a vehicle location tracking system. The computer includes software configured to specify for each trajectory of the pair of overall trajectories a plurality of successive waypoints, a safe stopping interval and an intermediate interval greater than the safe stopping interval; exchange a forecasted trajectory associated with each vehicle to the other vehicle of the pair of vehicles, the forecasted trajectory comprising a subset of the associated overall trajectory; control movement of each vehicle of the pair of vehicles in coordination with one another along the respective forecasted trajectory; sense a rate of exchange of additional waypoints data between the respective vehicles; determine for each trajectory the distance from the associated vehicle to an end of the safe stopping interval; update a position of the vehicles periodically, and sequentially thereafter update the forecasted trajectory with at least one additional waypoints in response to the respective vehicles traversing at least one waypoint of the forecasted trajectory; determine a remainder length of the forecasted trajectory and compare the remainder length to the intermediate interval and the safe stopping interval, in response to a sensed reduction in a rate of exchanging additional waypoints; continue traversing the forecasted trajectory in response to the remainder length being greater than the intermediate interval; generate a warning signal in response to the remainder trajectory length being less than or equal to the intermediate interval and greater than the safe stopping interval; and control the associated vehicle to a gradual stop within the safe stopping interval in response to the remainder trajectory length being equal to or less than the safe stopping interval.

One advantage is the vehicles controls operate properly and safely even with a scarce wireless communication.

Another advantage is that there is no need for any distance sensing sensors, e.g. ultrasonic, radar or laser sensors, for sensing the distance between vehicles.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 2 is a diagram of two coordinated vehicle paths including way points and safe stopping trajectories during normal communication.

FIG. 3 is a diagram of two coordinated vehicle paths including new way points exchanged between vehicles and safe stopping trajectories during normal communication.

FIG. 6 is a flow chart of the method of coordinated vehicle movement and safe stopping sequence.

Wherever possible, the same reference numbers are used throughout the drawing to refer to the same or like parts.

DETAILED DESCRIPTION OF THE INVENTION

Figure 1:
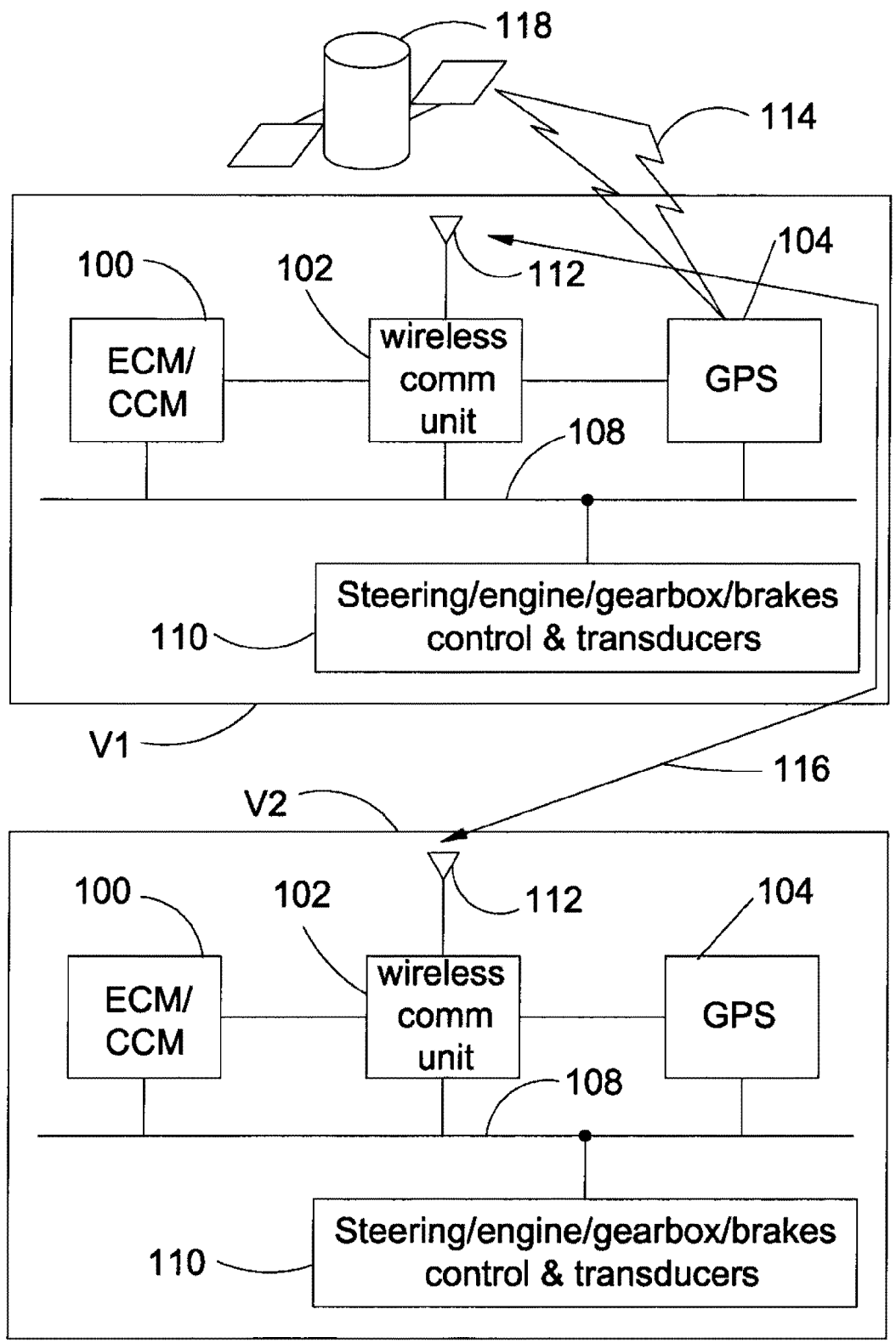
FIG. 1 is a block diagram of the vehicle onboard control system components.

Referring first to FIG. 1, each vehicle V1, V2 is equipped with an on board computer control unit 100. The onboard computer 100 can be referred to as an electronic control unit (ECU) when disposed on tractors, or combine control module (CCM's) on combines. Also a wireless communication module 102, GPS 104 and a gateway node 106. All of the control system devices 100, 102, 104 & 106 are linked together by the Controller Area Network (CAN) 108 bus on the vehicle V1 or V2. The ECU or CCM 100 also includes control interfaces for various steering, accelerator and brake system transducers 110. An antenna 112 receives electronic communication signals, via link 114 to GPS satellite 118, or via wireless link 116. The control system includes many other features that are not shown in FIG. 1. These features have been purposely omitted to simplify the drawing for ease of illustration.

Referring to FIG. 2, vehicles V1 and V2 commence coordinated operation along adjacent paths or trajectories, 10, 20, respectively. Each path traverses a set of way points 12. When the coordinated operation starts, the vehicles V1 and V2 reciprocally exchange their respective forecasted trajectory 10, 20 by communicating their respective waypoints 12 to one another. Each way-point 12 specifies a set of parameters, including absolute time, and position from the GPS, along with direction and velocity. The direction and velocity may be calculated or received from the GPS. Alternately, instead of using an absolute time which is normally provided by GPS, relative time or elapsed time may be used. E.g., the system may define a starting time and then compute the elapsed time. In one embodiment the trajectories may include a primary trajectory 10 and a secondary trajectory 20. The secondary trajectory 20 is computed as a function of the primary trajectory 10. The forecasted trajectory is a portion of the entire projected trajectory. E.g., the forecasted trajectory 10, 20 may include that portion of the projected trajectory covering, in one embodiment a distance, e.g., 50 m, or in another embodiment, covering a time interval, e.g., 10 seconds of travel time.

As indicated above, a trajectory 10, 20, or a portion thereof, is defined by a set of way-points that include parameters of time, position, direction and velocity, and other parameters that describe the vehicles. The vehicles V1, V2 employ the same algorithm to interpolate the trajectories 10, 20, The algorithm may be any method of estimating an intermediate value from two know values, including linear and nonlinear interpolation methods. Examples include spline interpolation, vector or points and vector interpolation, and other methods of trajectory interpolation as known to those having skill in the art. The interpolation algorithm permits the user to identify find the forecasted position, direction and velocity at any time instant of interest for the associated vehicle, V1 or V2. In this manner a long trajectory can be easily exchanged by using fewer way-points, and the trajectory can be exchanged even over a slow or faulty wireless connection.

While the vehicles V1 and V2 are in motion, the control system controls of the vehicle on the forecasted trajectory. The vehicles mutually transmit new or updated way-points 12, frequently enough to maintain a sufficiently long trajectory 10, 20. As indicated in FIG. 1, initially a set of way-points 12 provide a trajectory 10 of overall length L having a safe stopping interval L1 and an intermediate length interval L2 that is greater than interval L1 and includes the distance L1. Overall length L defines the distance from the current vehicle location to the end of the safe stopping trajectory L1, and initially L is greater than interval L2. Safe stopping interval L1 may be the distance between the last two way points 12 of the trajectory 10, 20, or L1 may include the last N way points 12, where N is an integer value equal to or greater than two. The number of safe stopping trajectory waypoints 12 is selected based on the velocity of the associated vehicle, and the desired time or distance in which the vehicle will stop safely.

Referring to FIG. 3, the trajectories 10, 20 shown in FIG. 1 are shown with the vehicles V1 and V2 advanced after an elapsed time period. The dotted lines 10a, 20a indicate segments or portions of the trajectories 10, 20 that have been passed by the vehicles V1 and V2. As the vehicles V1 and V2 continue traverse the trajectories 10, waypoints 12 are added defining the next segments 10b, 10c and 20b, 20c along the trajectories. Waypoints 12 are exchanged between the vehicles by wireless communication to extend the trajectories continuously.

Figure 4:
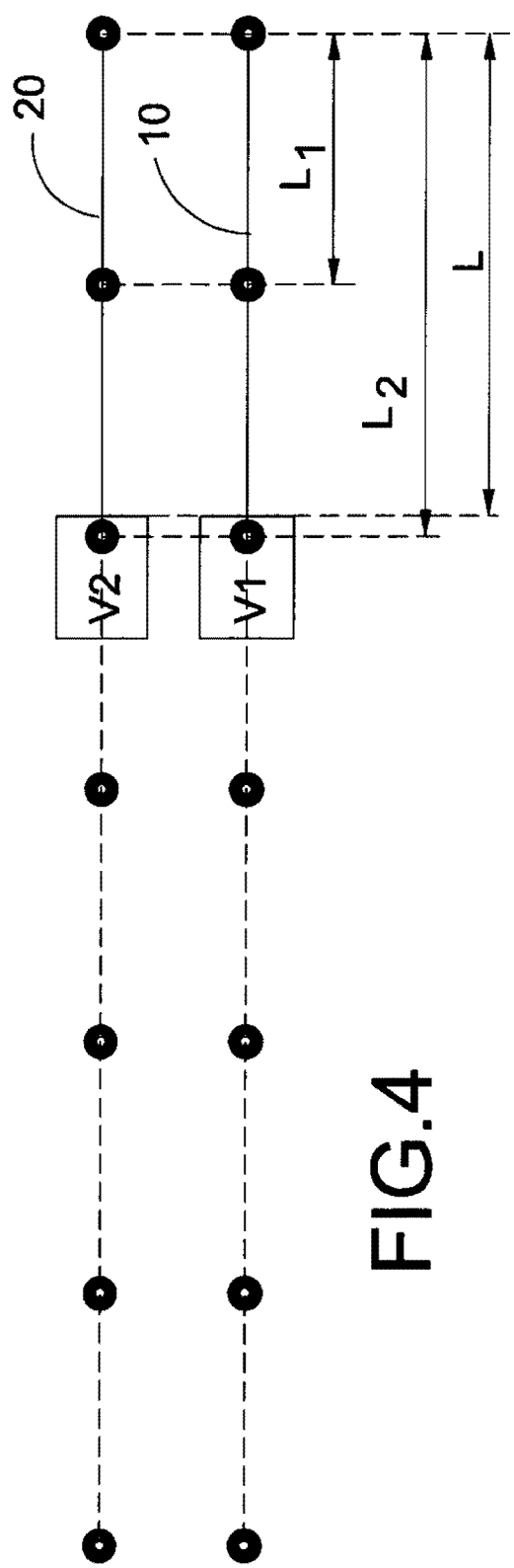
FIG. 4 is a diagram of two coordinated vehicle paths including way points and safe stopping trajectories when manual operation of the vehicles is required.

Referring next to FIG. 4, in some instances a loss of communication may occur. If the wireless communication slows or fails, the control system cannot update the waypoints continuously, and the remaining length of the forecasted trajectory 10, 20 is shortened. In the example of FIG. 3, L indicates the length of the forecasted trajectory. Assuming that intervals L1 and L2, wherein L1<L2, provide two thresholds for the remaining forecasted trajectory length expressed as a remaining distance, as a remaining travel time or in terms of way-points; the control system performs the following actions.

As long as L remains greater than L2, the control system maintains normal system operations as described above with respect to FIGS. 1 and 2. However, once L2 becomes greater than L, i.e., L2>L>L1, which is the case illustrated diagrammatically in FIG. 3, a warning signal is generated by the controller. The vehicles V1 and V2 continue to be controlled along the forecasted trajectories 10, 20, and the warning signal is displayed or emitted (e.g., by a loudspeaker). The warning signal warns the respective drivers of vehicles V1 and V2 to prepare to take manual control of the vehicle. If one vehicle is considered as a secondary, it will only be necessary for the driver of the secondary vehicle to take manual control of driving.

Figure 5:
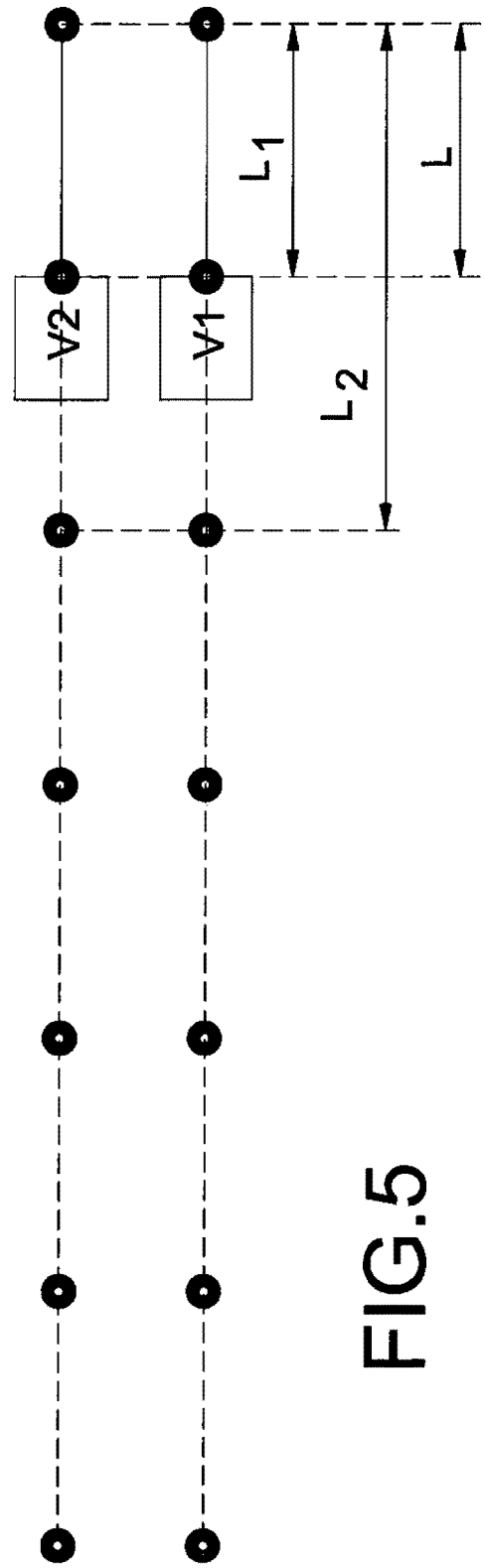
FIG. 5 is a diagram of two coordinated vehicle paths stopping if manual operation of the vehicles does not occur.

Referring next to FIG. 5, if the wireless communication signals have not recovered after an additional period, and no additional trajectories have been exchanged, (i.e. no waypoints updates), then the remaining overall length L eventually will become less than the safe stopping trajectory L1, i.e., L1>L. If the driver or drivers have not already assumed manual control of driving in response to the warning signal above, at least on the secondary vehicle V2, and the wireless connection is still lost, the vehicles V1, V2, or at least the secondary vehicle V2, are brought to a controlled stop by following the remainder of the safe stopping trajectory L1. Optionally, a second warning may be emitted or displayed.

The algorithm for the computation of the safe stopping trajectory is the same for both vehicles and can compute the safe stopping trajectory using known way-points. Therefore, even in case of complete communication fault, if manual control is not taken on either vehicle, the two vehicles V1 and V2 will come to a stop in a safe, predetermined trajectory. If manual control is taken on only one vehicle, e.g., the vehicle designated as the primary vehicle, V1, the driver must control the primary vehicle to avoid the colliding with the secondary vehicle, V2, as the primary vehicle is in the process of coming to a controlled stop. The "primary-secondary" configuration is important when one vehicle is automatically guided. The automatically guided vehicle V1 is the primary vehicle, and vehicle V2 is the secondary. The stopping trajectory of the secondary vehicle V2 is computed as a function of the primary vehicle trajectory. In this manner, the vehicles controls operate properly and safely even when the wireless communication signal drops out.

Referring next to FIG. 6, the method of coordinated control for two vehicles during loss of communications is described. At step 510, the method begins by providing vehicles V1, V2 equipped with onboard computer, wireless communication device and a vehicle location tracking system. The system proceeds to step 512, to specify an overall trajectory, a safe stopping interval and an intermediate interval greater than the safe stopping interval, for each vehicle V1, V2. Next, at step 514, the vehicles are positioned at a pair of predetermined starting points in predetermined relation to the trajectory. At step 516, the vehicles V1 and V2 exchange forecasted trajectory, as a subset of the overall trajectory, associated with each vehicle. Next, at step 518, the systems proceeds to control the relative motion of each vehicle along the forecasted trajectory, in coordination with adjacent vehicle. At step 520, the system determines the distance from the vehicle to end of the safe stopping interval for each forecasted trajectory. At step 522, the vehicles mutually exchange updated waypoint data. At step 524, the vehicles sequentially update the forecasted trajectory with additional waypoints in response to the respective vehicles bypassing waypoints of the forecasted trajectory. At step 526, the system determines whether there is any reduction in rate of data exchange for additional waypoints, relative to a threshold data exchange rate, including a complete loss of waypoint data exchange. If the system determines that the exchange rate is below the reference threshold, then at step 528, the system determines the remainder length of the forecasted trajectory and compares the remainder length to the intermediate interval and the safe stopping interval. If the rate of data exchange is not less than the reference waypoint data exchange rate, then the system returns to step 516. Next, at step 530, the system determines a remainder length of the forecasted trajectory and compare the remainder length to the intermediate interval and the safe stopping interval. At step 532, if the remainder length L of the forecasted trajectory is greater than the intermediate length L2, then the system controls the vehicles to continue traversing forecasted trajectory; if L is less than or equal to L2, the system proceeds to step 534, and generates a warning signal, e.g., audio or visual, for the respective vehicle driver to assume manual control of the vehicle. Following step 534, the system determines the remainder length L of the forecasted trajectory and compares the remainder length to the safe stopping interval L1, at step 536, and if L is less than or equal to L1, the system controls the associated vehicles to stop within the safe stopping interval L1, at step 538. If L is greater than L1, then the system returns to step 516. If at any time the driver of either vehicle assumes manual control of the vehicle, either by switching from automatic guidance mode to manual mode, or by simply operating the steering or other manual controls, then the system for that vehicle will discontinue operation until the operator resets to automatic mode and initialized relative to the adjacent vehicle once again.

It will be appreciated by those skilled in the art that other methods of vehicle location tracking may be employed other than GPS. E.g., using camera based vision system and comparing the camera generated image to a reference image, two vehicles may be maintained in a predetermined relation to one another. Alternately, laser-edge guidance may be used to sense an edge on the adjacent vehicle. Also, the use of landmarks to establish one or more reference points in the field may be used as an alternative to sending and receiving GPS data.

The discussion above describes a controlled stopping sequence that is applied when one or both vehicles navigating in coordination drops wireless local communication with the other vehicle. In an alternate embodiment, the system may be applied to control the moving vehicles to a safe stop in the event that the GPS or other vehicle location tracking system communication is lost, using the method in the same manner as described above.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for controlling a stopping trajectory for a pair of vehicles traversing a respective pair of overall trajectories, using a control system including an onboard computer and a wireless communication device disposed on each vehicle, and a vehicle location tracking system, said method comprising the steps of:
    specifying for each overall trajectory of the pair of overall trajectories, a plurality of successive waypoints along the overall trajectory, a safe stopping interval and an intermediate interval greater than the safe stopping interval;
    exchanging through the wireless communication device a forecasted trajectory associated with each vehicle to the other vehicle of the pair of vehicles, the forecasted trajectory comprising a subset of the associated overall trajectory;
    controlling in coordination the relative motion of each vehicle of the pair of vehicles along the respective forecasted trajectory;
    for each forecasted trajectory, determining the distance from the associated vehicle to an end of the safe stopping interval;
    updating a position of the vehicles periodically;
sequentially updating the forecasted trajectory with additional waypoints in response to the respective vehicles bypassing waypoints of the forecasted trajectory;
    in response to sensing a reduction in a rate of exchanging additional waypoints, determining a remainder length of the forecasted trajectory and comparing the remainder length to the intermediate interval and the safe stopping interval; and:
    continuing to traverse the forecasted trajectory in response to the remainder length being greater than the intermediate interval;
    generating a warning signal in response to the remainder length being less than or equal to the intermediate interval and greater than the safe stopping interval; and
    gradually controlling the associated vehicle to a stop within the safe stopping interval in response to the remainder length being less than or equal to the safe stopping interval.

2. The method of claim 1, wherein each way-point specifies a plurality of parameters related to the associated trajectory, the plurality of parameters including at least two parameters selected from: time, position, direction and velocity.

3. The method of claim 1, wherein each waypoint of the plurality of successive waypoints describe a beginning point and a termination point of a segment of the trajectory.

4. The method of claim 1, wherein the warning signal warns the drivers of the respective vehicles to prepare to take manual control of the vehicle.

5. The method of claim 1, wherein the warning signal indicates at least one driver of the pair of vehicles to assume manual control of driving the associated vehicle.

6. The method of claim 1, further including the steps of:
    designating one vehicle a primary vehicle and the other vehicle a secondary vehicle, at least one driver is driving the secondary vehicle, the secondary vehicle having an overall trajectory that is computed as a function of a primary trajectory associated with the other vehicle; and
    determining the secondary vehicle overall trajectory, forecasted trajectory, safe stopping interval and intermediate interval based on the primary vehicle overall trajectory, forecasted trajectory, safe stopping interval and intermediate interval; and
    bringing the secondary vehicle to a controlled stop concurrently with the primary vehicle by following the remainder of the secondary vehicle safe stopping trajectory.

7. The method of claim 6, wherein only the driver of the secondary vehicle is required to take manual control of driving the secondary vehicle, and the primary vehicle is controlled automatically.

8. The method of claim 1, also including the step of positioning the pair of vehicles at a pair of predetermined starting points in predetermined relation to the trajectory.

* * * * *